United States Patent
Scharrer

[11] Patent Number: 5,186,220
[45] Date of Patent: Feb. 16, 1993

[54] FILLING NIPPLE FOR A FUEL TANK

[75] Inventor: Konrad Scharrer, Hildren, Fed. Rep. of Germany

[73] Assignee: Blau KG, Langenfield, Fed. Rep. of Germany

[21] Appl. No.: 723,852

[22] Filed: Jul. 1, 1991

[30] Foreign Application Priority Data

Jul. 4, 1990 [DE] Fed. Rep. of Germany ....... 4021218

[51] Int. Cl.$^5$ .............................................. B65B 31/06
[52] U.S. Cl. ........................................ 141/59; 141/44; 141/46; 141/312; 220/86.2; 220/746; 137/589; 137/43; 137/39
[58] Field of Search ..................... 141/44–46, 141/59, 302, 312; 220/86.1, 86.2, 89.1, 745–750; 123/516–519; 137/587–589, 39, 43

[56] References Cited

U.S. PATENT DOCUMENTS

| | | | |
|---|---|---|---|
| 4,351,350 | 9/1982 | Crute | 137/39 |
| 4,630,749 | 12/1986 | Armstrong et al. | 220/746 X |
| 4,699,638 | 10/1987 | Harris | 220/86.2 X |
| 4,706,708 | 11/1987 | Fornuto et al. | 137/588 |
| 4,714,172 | 12/1987 | Morris | 220/86.2 |
| 4,715,509 | 12/1987 | Ito et al. | 220/86.2 |
| 4,760,858 | 8/1988 | Szlaga | 137/43 |
| 4,809,863 | 3/1989 | Woodcock et al. | 220/86.2 X |
| 4,932,444 | 6/1990 | Micek | 141/59 |
| 4,934,417 | 6/1990 | Bucci | 141/1 |
| 4,941,587 | 7/1990 | Terada | 220/86.2 X |
| 4,966,299 | 10/1990 | Teets et al. | 220/85.2 X |
| 5,027,868 | 7/1991 | Morris et al. | 141/59 |
| 5,103,877 | 4/1992 | Sherwood et al. | 141/59 |

FOREIGN PATENT DOCUMENTS 3721049 1/1989 Fed. Rep. of Germany .

Primary Examiner—Ernest G. Cusick

[57] ABSTRACT

A nipple is attachable to the outer end of the fill pipe of a motor fuel tank and contains a closure flap and a number of other valves performing various functions. The nipple therefore can have unified in it mechanisms performing most or all of the functions required in association with the tank and can be made as a pre-assembled unit quickly and easily attached to a fuel tank in the manufacture of a vehicle to minimize the number of required assembly procedures.

8 Claims, 3 Drawing Sheets

FILLING NIPPLE FOR A FUEL TANK

BACKGROUND OF THE INVENTION

The invention concerns a tank filling nipple of the type connectable with a tank filling pipe with a closure flap arranged inside of the mounting nipple for movement between a closed position at which it engages a sealing seat and an open position at which it is lifted from the sealing seat and with a duct branching from the mounting nipple behind the sealing seat in the filling direction, in which duct an overfill valve operable by the adjustable closure flap is arranged, which overfill valve is closed upon opening of the closure flap, and also including an automatically opening overpressure valve.

In the construction of modern automobiles it is becoming more and more common to apply a filling nipple to the end of the tank filling pipe, which nipple unifies several different functions. Such tank filling nipples generally contain a self-closing closure, which for example may be formed as a closure flap movable in the interior of the tank filling nipple and biased in the direction toward a sealing seat, and which closure flap is movable by the dispensing nozzle to its open position.

A tank filling nipple of the type mentioned in the preamble of claim 1 is already known from DE 37 2-1 049 A1. This nipple is provided with a duct branching from the mounting nipple from behind the sealing seat in the filling direction, and in which duct is arranged an overfill valve operable by the movable closure flap. This overfill valve is open when the closure flap is closed so that in the case of warming the expanding fuel can overflow through this duct into a compensating container. This overfill valve is coupled with the closure flap so that it is closed when the closure flap is opened to avoid an overflow of the fuel into the compensating container. This solution is relatively expensive since in addition to the main tank a separate compensating container must be provided which moreover in a non-described way must be connectable with the main tank in order that the overflown fuel eventually can flow back into the main tank.

Moreover, the known tank filling nipple is provided with an underpressure valve which automatically opens upon an overpressure in the tank so that a pressure compensation can take place. This overpressure valve is arranged on the closure flap with these parts being of complicated construction, heavy and bulky, so that difficulties can arise in the application of the closure flap to the interior of the tank filling nipple, and also the support as well as the return spring for the closure flap must suit its construction weight and size. Also there exists the danger that the overpressure valve which connects with the upper side of the closure flap may be damaged by the insertion of the dispensing nozzle, which damage generally makes necessary a replacement of the entire tank filling nipple.

A further disadvantage of the known construction occurs in the following way: the overfill valve operated by the closure flap is necessarily arranged by the involved construction directly below the sealing seat of the closure flap so that the overflow level also is positioned directly below the closure flap which no longer meets the intended safety requirements. It is much more desired that the highest possible fill level in the normal position of the vehicle be positioned a given amount below the sealing seat.

To assure a trouble-free flow of the fuel from the tank during normal motor operation the tank must also be provided with a ventilating valve which moreover at a given predetermined inclined position of the vehicle, or upon a turning over of the same, must automatically close to, for example in the case of an accident, prevent dangerous discharge of the fuel. Such ventilating valves are generally provided by the tank manufacturer since previously no possibility appeared to apply these in the region of the closure flap similarly to the overpressure valve. Therefore, in the manufacture of vehicles it has generally been necessary to have two separate assembly processes for the ventilating valve on one hand and for the tank filling nipple on the other hand which with the large numbers and short assembly times of modern motor vehicles can amount to considerable assembly costs.

The object of the present invention is to provide a tank filling nipple of the type mentioned in the preamble of claim 1 which with regard to simple construction and reliable function fulfills all desired operating and safety requirements and which in comparison to the functioning of known devices can include additional functions so that some assembly processes in the construction of tanks can be spared.

SUMMARY OF THE INVENTION

This object is solved in that the branching off duct is connected with a dead space formed in the upper region of the fuel tank, the overpressure valve is associated with a second duct connected with the mounting nipple behind the sealing seat, and a ventilating valve is arranged in a third duct connected with the mounting nipple behind the sealing seat which ventilating valve is open in the normal position of the vehicle and which automatically closes at a given inclined position of the vehicle.

The first branching off duct is not connected with a compensating container but with a dead space formed in the upper region of the fuel tank. Since the overfill valve is closed during tanking there is formed, when the condition of fill reaches the lower edge of this dead space, an air or gas bubble. When the dispensing nozzle is withdrawn from the tank filling nipple and the closure flap closes the overfill valve automatically opens so that the gas captured in the dead space escapes and fuel can flow in the return direction whereby the fill condition in the tank filling pipe sinks to the pre-given amount below the sealing seat.

The overpressure valve is not arranged on the closure flap, but is associated with a second duct connected with the mounting nipple behind the sealing seat. Thereby on one hand the construction of the closure flap is considerably simplified, whereby especially the danger is avoided that the overpressure valve will be damaged by the dispensing nozzle upon the opening of the closure flap, and on the other hand the overpressure valve can be better designed for its purposes independently of the size of the closure flap, so that a further improvement in the functional reliability and precision is achieved.

Further, in a third duct connected with the mounting nipple behind the sealing seat is arranged a ventilating valve which in the normal position of the vehicle is open and which in a certain inclined position, or upon overturn, of the vehicle automatically closes. Therefore, since the normal ventilating function is also associated with the tank filling nipple the assembly of a separate ventilating valve is saved so that essentially all of the functions required by the fuel tank can be installed in a single mounting process, namely by the mounting onto the tank of the filling nipple of this invention.

The ventilating valve is designed for the normal operation of the motor, while the overpressure valve is provided for the case in which by certain circumstances an overpressure is formed in the tank which could lead to a bursting of the tank. Also to provide for the case in which a dangerous underpressure forms in the tank, in accordance with one embodiment of the invention an underpressure valve is arranged in a second duct which automatically opens upon the appearance of an underpressure in the fuel tank.

In accordance with a further embodiment of the invention it is provided that the second duct and the third duct branch from a common connecting manifold connecting with the mounting nipple behind the sealing seat. This measure makes it possible on one hand to achieve a compact construction and on the other hand allows a pre-assembly of the overpressure valve, the underpressure valve and the ventilating valve into a single unitary construction group which thereupon can be assembled with the tank filling nipple in a single work procedure.

Further advantages and features of the invention will be apparent from the claims, the drawings, and the description of the drawings.

BRIEF DESCRIPTION OF THE DRAWINGS

In the drawings several embodiments of the invention are illustrated which are hereinafter described in more detail. The drawings are.

DESCRIPTION OF THE PREFERRED EMBODIMENTS

Figure 1:
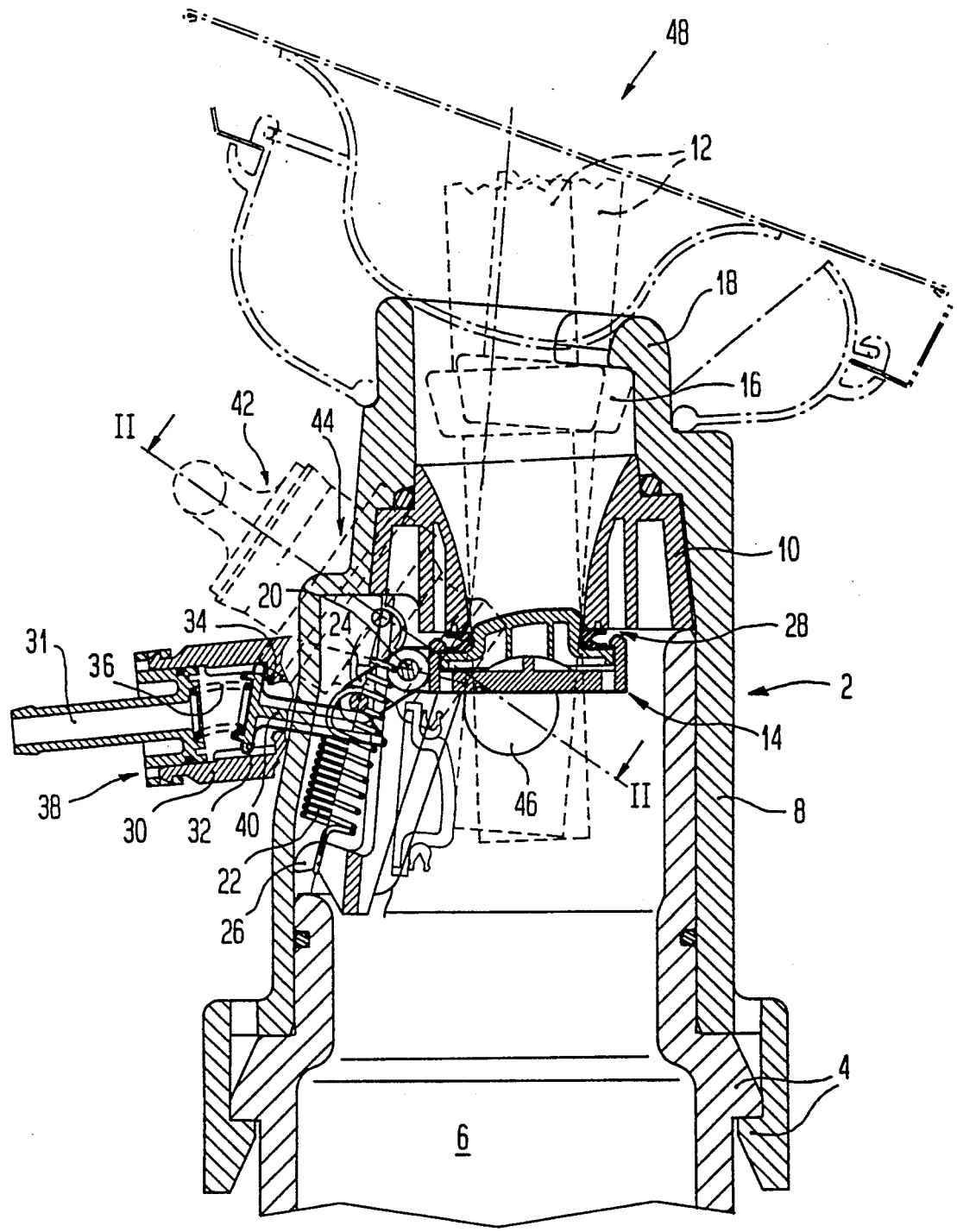
FIG. 1 - A longitudinal section through a tank filling nipple with an internal closure flap, an overfill valve and further valves.

The tank filling nipple 2 illustrated in FIG. 1 is attached to the end of a tank filling pipe 6 by means of a snap catch 4. Another type of fastening, for example one accomplished by means of welding, is possible, but has not been illustrated.

The tank filling nipple 2 consists essentially of a mounting nipple 8 into which different functional elements, described hereinafter in more detail, are integrated.

Inset in the mounting nipple 8 in the area of its outer mouth is a collar 10 which on one hand serves to guide the dispensing nozzle 12 and which on the other hand serves as a sealing seat for a closure flap 14 also arranged in the mounting nipple 8. As can be seen from FIG. 1 the collar 10 is so formed that the dispensing nozzle 12, when in an inserted condition can undertake a pivotal movement about a given angle to permit the insertion of the nozzle as well as a subsequent hooking of a holding protuberance on the dispensing nozzle behind an edge shoulder 18 formed at the mouth of the mounting nipple 8.

The closure flap 14 is pivotal about a pivot axis 20, positioned transversely to the longitudinal axis of the mounting nipple 8, between a closed position illustrated by heavy lines and an open position illustrated by light lines. In its closed position the closure flap 14 lies sealingly on the lower mouth edge of the collar 10. It is held in position on this lower mouth edge of the collar 10 by a tension spring 22 hooked on one side to an arm 24 formed on the closure flap 14 and hooked on the other side to a fastening hook 26 arranged in the mounting nipple 8. The tension spring 22, the lever length of the arm 24, and the like, are so designed that the closure flap 14 on one hand sealingly engages the sealing seat and on the other hand can be moved from its closed position to its open position by the dispensing nozzle 12.

A duct 31 formed by a tubular part 30 branches from the mounting nipple 8 behind the sealing seat 28 in the filling direction and has arranged in it a disc valve 32. The disc valve 32 is worked on by a compression spring 36 which biases the valve in the direction toward the valve seat 34. The tubular part 30, the disc valve 32 and the valve seat 34 form an overfill valve 38.

As can be seen from FIG. 1, the disc valve 32 has a valve stem 40 extending to the interior of the mounting nipple 8, which stem cooperates with the arm 24 associated with the closure flap 14. In the closed position of the closure flap 14, as shown by solid lines in FIG. 1, the valve stem 40 is laterally displaced so that the valve disc 32 is lifted from the valve seat 34 to open the valve. In the open position of the closure flap, as shown by light lines, the arm 24 is out of engagement with the valve stem 40 so that the valve seats on the valve seat 34 thereby closing the overfill valve 38.

The tubular part 30 forming the duct diverging from the mounting nipple 8 is, as not illustrated in more detail, connected by a conductor with the upper region of the dead space of the fuel tank, in which dead space during the filling of the fuel tank an air or gas bubble is formed, which bubble is captured in the dead space so long as the overfill valve 38 is closed during tanking. After the tanking process the dispensing nozzle is withdrawn from the mounting nipple 8, whereupon the closure flap 14 is closed under the influence of the spring 22 and the overfill valve 28 is opened by the arm 24, so that the gas bubble captured in the dead space can escape now and so that fuel can flow back; whereby the fuel sinks in the mounting nipple 8 or in the filling pipe 6 until reaching a full level which clearly lies below the sealing seat 28.

Figure 2:
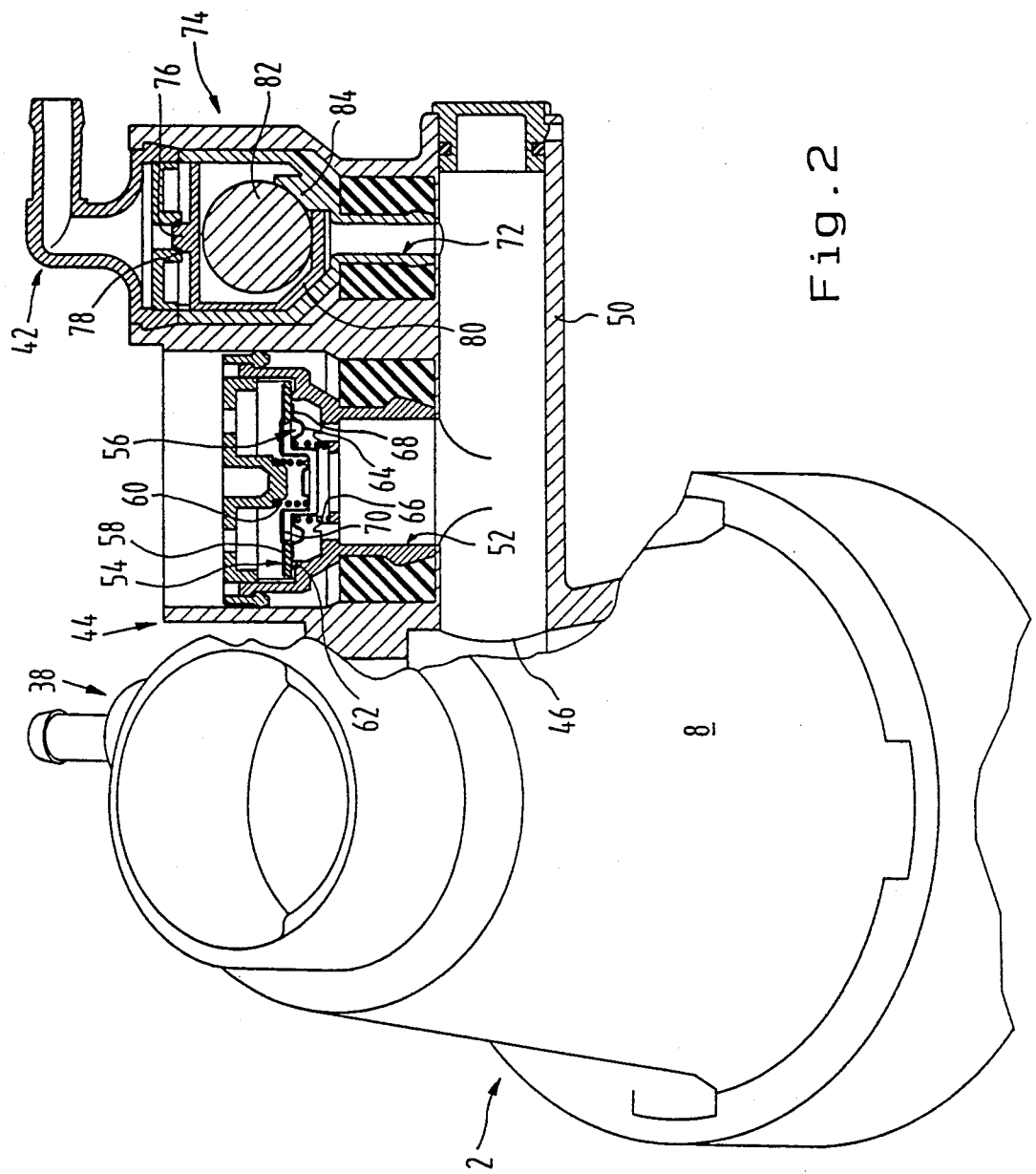
FIG. 2 - A partial section taken along the section line II—II of the tank filling nipple illustrated in FIG. 1.

As can be seen from FIG. 1, further valve arrangements 42 and 44, which are described in more detail in connection with FIG. 2, are associated with the mounting nipple 8. These two valve arrangements 42 and 44 control ducts which likewise are connected, through a junction mouth 46, with the interior of the mounting nipple 8 behind the sealing seat 28 in the filling direction.

FIG. 2 shows the tank filling nipple 2 of FIG. 1 in a view taken in the direction of the arrow 48, with the area of the valve arrangements 42,44 being shown in a section taken on section line II—II. A connecting manifold 50 opens into the mounting nipple 8 through the mouth 46 and has a free end extending away from the mounting nipple 8 and closed by a plug. A duct 52 branches from the connecting manifold 50 and has arranged in it an overpressure valve 54 as well as an underpressure valve 56. The overpressure valve 54 and the underpressure valve 56 are combined into a single device. The overpressure valve 54 is formed essentially as a disc valve 58 which is held in position on a valve seat 62 by a spring 60. The spring 60 is so designed that the disc valve 58 is lifted upon a predetermined overpressure appearing in the tank to permit a pressure compensation. The underpressure valve 56 is likewise formed as a disc valve 64 which is held in position on a valve seat 68 by a spring 66, the valve seat 68 being formed by the edge of a concentric opening 70 formed in the first disc valve 58. The spring 66 is so designed that upon a fixed pre-given underpressure appearing in the tank the disc valve 64 is lifted and permits a pressure compensation to atmosphere.

A further duct 72 branches from the connecting manifold 50 and has arranged in it a ventilating valve indicated generally at 74. This valve includes a valve body 76 which cooperates with a concentric valve seat 78. In the normal case, that is in the normal position of the vehicle, the valve body 76 is removed from the valve seat 78 so that the tank is constantly ventilated through the connecting manifold 50. The valve body 76 is connected with a cage in which is freely movably received an operating mass 82 formed as a ball. The cage bottom has support ramps 84 extending upwardly and outwardly on which the ball 82 rests. Upon the vehicle reaching a given inclined position the ball 82 rolls along the support ramps and engages the upper side of the cage 80, whereupon the valve body 76 lies on the valve seat 78 and the valve becomes closed. Thus, upon the vehicle reaching a given inclined position or upon the vehicle turning over a discharge of fuel through the ventilating valve 74 is avoided. The ventilating valve 74 is connected by a non-illustrated conductor with an activated charcoal filter which captures the environmentally detrimental portions of the gas.

Figure 3:
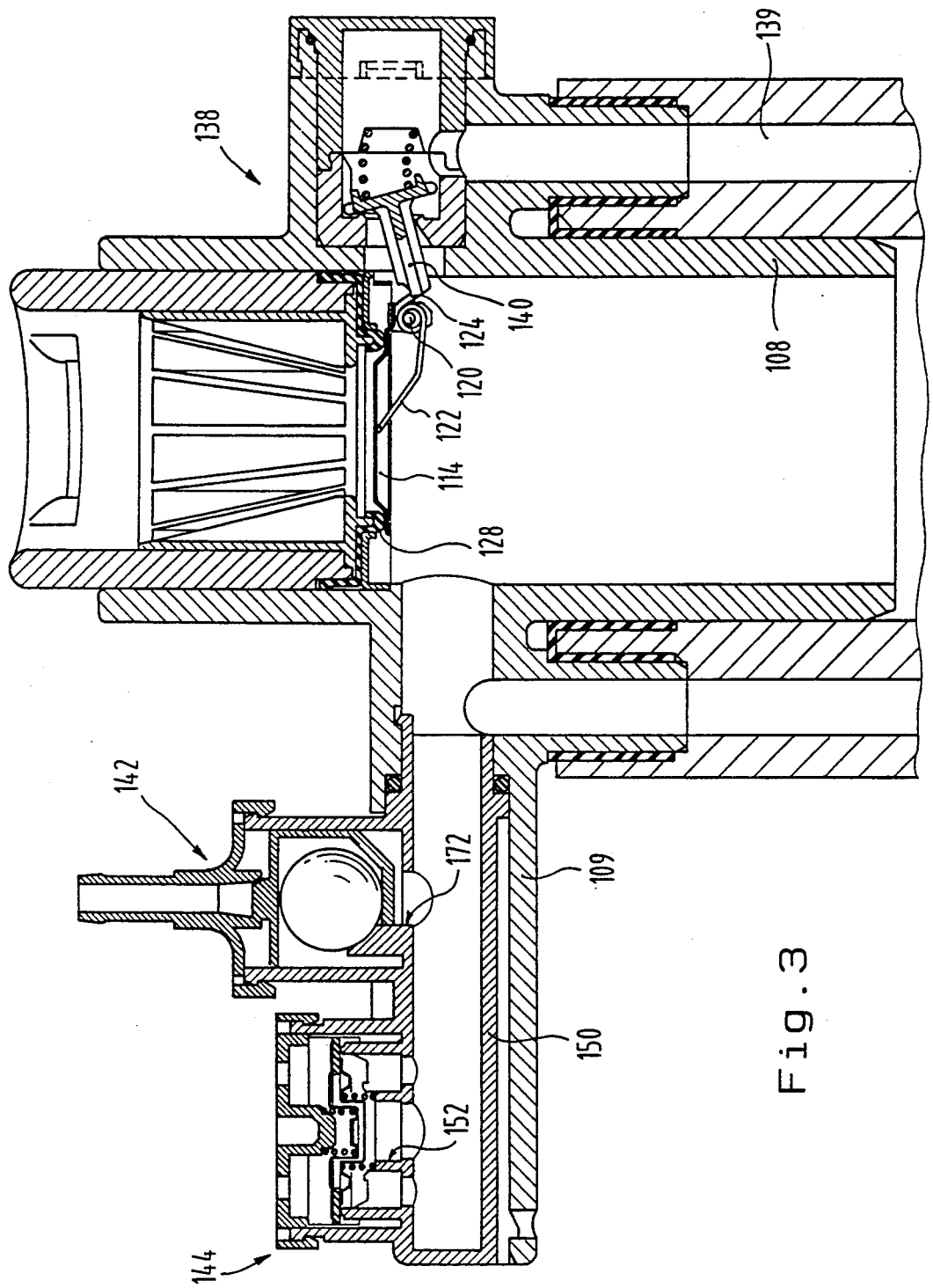
FIG. 3 - A longitudinal sectional view through a tank filling nipple comprising another embodiment.

FIG. 3 shows an arrangement which in principle corresponds to the apparatus illustrated in FIGS. 1 and 2. The following description therefore is directed only to the several essential differences relative to the previously described embodiment.

The closure flap 114 is formed somewhat disc-like. It is pivotally supported in the interior of the mounting nipple 108 for movement about a pivot axis 120 positioned perpendicularly to the axis of the mounting nipple 108. A spring 122 arranged coaxially to the pivot axis 120 presses the closure flap 114 to its closed position, in which it engages a sealing seat 128. An extension arm 124 extending from the closure flap 114 is, in the way described in FIG. 1, cooperable with the valve stem 140 of the overfill valve 138, which overfill valve frees a fluid conductor or pipe 139 leading to a dead space of the tank in the case of a closed closure flap 114 and which overfill valve upon opening of the closure flap 114 shuts off the conductor as already described. A valve arrangement 144 forming a combined overpressure and underpressure valve as well as a ventilating arrangement 142, illustrated as a ventilating valve, are arranged in ducts 152 and 172 branching from a connecting manifold 150. The connecting manifold 150 is combined with the valve arrangements 142 and 144 into a pre-assembled unit which is placed into a carrier 109 formed of one piece with the mounting nipple 108.

I claim:

1. A tank filling nipple for a vehicle fuel tank including a mounting nipple connectable with a tank filling pipe, a closure flap and a sealing seat arranged inside of the mounting nipple, said closure flap being movable between a closed position at which it engages said sealing seat and an open position at which it is lifted from said sealing seat, a branch duct branching from the mounting nipple behind the sealing seat in the filling direction, an overfill valve in said branch duct operable by said adjustable closure flap, which overfill valve is closed upon opening of the closure flap, and an automatically opening overpressure valve, characterized in that,
    said branch duct (31) is connected with a dead space formed in the upper region of the fuel tank,
    a second duct (52) is connected with the mounting nipple (8) behind the sealing seat (28) and is associated with said overpressure value (54),
    a third duct (72) is connected with the mounting nipple (8) behind the sealing seat (28), and
    a ventilating valve (74) is arranged in said third duct, said ventilating valve being open in the normal position of the vehicle and automatically closing at a given inclined position of the vehicle.

2. A tank filling nipple according to claim 1 further characterized by an underpressure valve (56) which automatically opens in response to an underpressure in the fuel tank, said underpressure valve being associated with said second duct.

3. A tank filling nipple according to claim 1 further characterized by a common connecting manifold (50) opening into the mounting nipple (8) behind the sealing seat (28), said second duct (52) and said third duct (72) branching from said common connecting manifold.

4. A tank filing nipple according to claim 1 further characterized in that the overfill valve (38) is formed as an overfill valve seat and a spring loaded disc valve (32), a valve stem (40) extending from said disc valve to the interior of the mounting nipple (8), and an actuating arm (24) connected to said closure flap (14), said valve stem cooperating with said actuating arm.

5. A tank filling nipple according to claim 4 further characterized by a spring (36) for urging said disc valve (32) to its closed position said valve steam (40) upon closing of said closure flap being laterally displaced by the operating arm (24) and the disc valve (32) being lifted from said overfill valve seat (34) against the force of the spring (36).

6. A tank filling nipple according to claim 1 further characterized in that the overpressure valve (54) and the underpressure valve (56) include an overpressure valve disc (58) and an underpressure valve disc (64) arranged concentrically to one another, said overpressure valve disc (58) being of larger diameter than said underpressure valve disc (64), and said overpressure disc valve (58) having a concentric opening (70) which serves as the valve seat (68) for the underpressure valve disc (64).

7. A tank filling nipple according to claim 1 further characterized in that the ventilating valve (74) is formed as a gravity operated valve having a ventilating valve body (76), and a cage (80) connected with said ventilating valve body, and an operating mass (82) arranged in said cage for free movement.

8. A tank filling nipple according to claim 7 further characterized in that said cage (80) has a bottom with upwardly and outwardly extending support ramps (84), said operating mass being a ball which freely rests on said support ramps.

* * * * *